United States Patent [19]

Terpstra

[11] Patent Number: 4,684,466

[45] Date of Patent: Aug. 4, 1987

[54] FILTER FOR A HIGH PRESSURE SEPARATING PRESS

[75] Inventor: Paulus N. Terpstra, Zaanstad, Netherlands

[73] Assignee: Cacaofabriek de Zaan B.V., Koog aan deZaan, Netherlands

[21] Appl. No.: 744,591

[22] Filed: Jun. 14, 1985

[30] Foreign Application Priority Data

Jun. 26, 1984 [NL] Netherlands ........................ 8402010

[51] Int. Cl.[4] ........................ B01D 25/12; B30B 15/00

[52] U.S. Cl. ...................................... 210/227; 99/495; 100/116; 100/125; 100/297; 210/231; 210/489; 210/495

[58] Field of Search ............... 100/110, 116, 125, 297; 99/495; 210/224-231, 489, 495

[56] References Cited

U.S. PATENT DOCUMENTS

| | | | |
|---|---|---|---|
| 1,713,478 | 5/1929 | Michel | 100/297 X |
| 3,347,383 | 10/1967 | Augerot | 210/231 X |
| 3,669,267 | 6/1972 | Hutton | 210/231 X |
| 4,379,051 | 4/1983 | Hiesinger et al. | 210/231 X |

FOREIGN PATENT DOCUMENTS

| | | |
|---|---|---|
| 183286 | 6/1986 | European Pat. Off. . |
| 672944 | 3/1937 | Fed. Rep. of Germany . |
| 1145925 | 3/1963 | Fed. Rep. of Germany . |
| 41552 | 4/1937 | Netherlands . |

*Primary Examiner*—Richard V. Fisher
*Assistant Examiner*—W. Gary Jones
*Attorney, Agent, or Firm*—Ronald A. Bleeker

[57] ABSTRACT

A filter is described which is particularly designed for use in a high pressure separating press, e.g. a cocoa press, so as to considerably increase the useful life of the filter by avoiding breakage of metal screen components. The filter is characterized by positioning of the screen components in a metal ring provided with a peripheral flange which extends in a radially inward direction towards the axis of the filter, the inner diameter of which flange differs from the inner diameter of the ring by about half the difference between the diameter of the pitch circle of the outer groove of the press platen and the inner diameter of the ring.

20 Claims, 4 Drawing Figures

FILTER FOR A HIGH PRESSURE SEPARATING PRESS

BACKGROUND OF THE INVENTION

This invention relates to an improved filter for use in high pressure separating presses, e.g. cocoa presses. Known filters contain metal screen components consisting of one or more plates of twilled gauze made from steel wire, preferably chromium-nickel steel wire. The mounting of these gauze plates in the front-face of a press platen of a separating press is an act requiring craftsmanship, because the outer rim of the gauze plate is bent through 90° and then fastened in place, e.g. by pressing a fastening means (e.g. a cord) into a circular recess of the press platen, said recess often having a trapezoidal cross-section. It is unavoidable that the weft threads of the screen component loosen, notably in the zone where the warp threads are in radial or virtually radial direction. This results in the development of weak points in the gauze plates where, in spite of skilled and precise mounting, further damage, e.g. breakage of wires, not infrequently occurs. The warp threads of such gauze plates typically have a diameter between about 0.3 and 0.35 mm and the weft threads have a diameter of about 0.2 mm.

During the operation of the separating presses such high pressures are used that breakage or further breakage of wires may occur at the weak points of the gauze plates. Once a wire is broken somewhere along its length, the protruding end can become trapped in the press cake and consequently be broken off when the press cake is removed. If this happens in the case of a cocoa press or a press for food or feed material, this can lead to pieces of wire getting into the press cake, resulting in damage to the mill or to customer complaints.

The occurrence of broken wires, and also of excessive deformation of the gauze plates, must be checked for by regular inspection. As soon as this is found to occur, the filter must be replaced. The time during which the filter screen serves before it must be removed is called the useful life of the screen component.

SUMMARY OF THE INVENTION

It is the object of this invention to considerably reduce the problems described above and to provide a filter screen which has a considerably longer useful life than known filter screens. Futhermore, the filter screen of the invention should be usable without a need for costly adaption or alteration of existing separating presses.

According to the invention, these objectives are achieved by positioning or framing the layer or layers of filtering material in a metal ring provided with a peripheral flange which extends in a radially inward direction towards the axis of the filter, the inner diameter of which flange differs from the inner diameter of the ring by about half the difference between the diameter of the pitch circle of the outer groove of the press platen and the inner diameter of the ring.

DETAILED DESCRIPTION OF THE INVENTION

It has now been discovered that the useful life of filter screens used in high pressure separating presses can be considerably extended without the need for costly adaptation of existing presses. This is achieved by framing or positioning the layer or layers of filtering material in a metal ring provided with a peripheral flange which extends in a radially inward direction towards the axis of the filter, the inner diameter of which flange differs from the inner diameter of the ring by essentially half the difference between the diameter of the pitch circle of the outer groove of the press platen and the inner diameter of the ring. In a preferred embodiment, the diameter of the peripheral flange is smaller than the inner diameter of the ring.

An additional feature of the invention is particularly applicable to cocoa presses or similar high pressure presses. In this aspect of the invention, one or more supporting screens are included in the filter packet. A woven gauze press mat is placed on top of these supporting screens, such that the lower surface of the lower supporting screen is at essentially half the total height of the thickness of the ring plus the flange.

It has been found that use of this invention reduces wire breakage in the filter screens, resulting in a considerably longer useful life. The only significant change which is required to adapt existing high pressure presses for this invention is some widening and deepening of the circular recess.

The invention will be further explained below with the help of the drawings.

In a cross-section of a press platen 1 of a high pressure press (not shown), such as a cocoa press, which is adapted to receive a filter screen 7 according to the invention, characters A, B, and C are used to indicate the following diameters:

A=the inner diameter of a peripheral flange 9 of a metal ring 8;

B=the inner diameter of the ring 8; and

C=the pitch circle of the outer groove 5' of the press platen 1.

Figure 2:
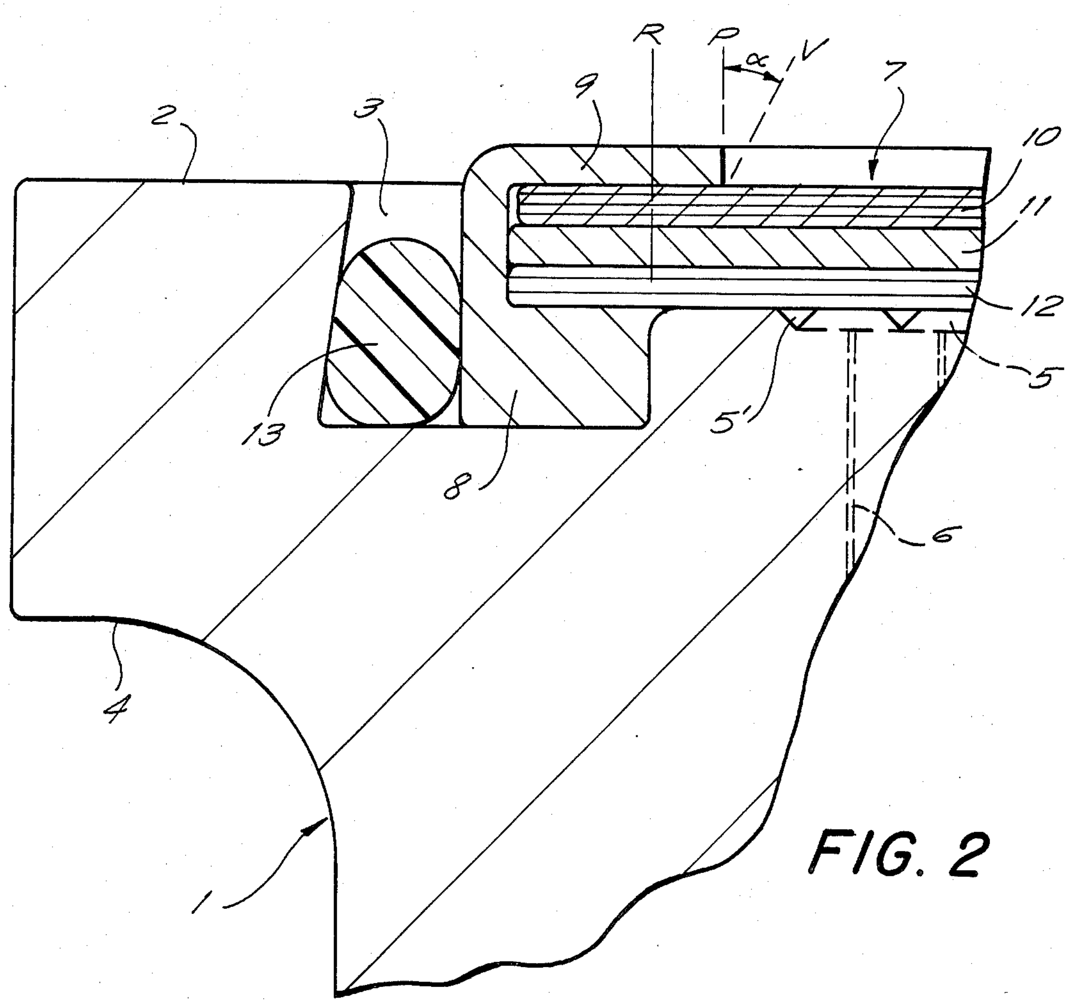
FIG. 2 is an enlarged sectional view of the left hand part of FIG. 1, showing a first embodiment wherein a filter packet is framed or positioned in the ring and the complete filter screen is fastened to the press platen by means of an elastic band or cord.

The press platen 1, shown in more detail in FIG. 2, has a front face 2 in which a circular recess 3 with trapezoidal cross-section has been made. A reversed curved surface 4 of the press platen 1 together with a packing consisting of a felt ring (not shown) is to provide the seal between the press chamber of the high pressure press and the atmosphere.

Furthermore, the press platen 1 has in a well-known fashion a number of circular grooves 5 with, e.g. a triangular cross-section, each of which is connected with a number of bores 6. In a cocoa press, the grooves 5 and the bores 6 are part of the route which the cocoa butter follows. The so-called cocoa cake then remains above the front face 2, partially in the recess 3 and against a filter screen 7.

The filter screen 7 consists of a metal ring 8 with peripheral flange 9 which extends radially inward towards the axis 17 of the filter, in which is framed or positioned a filter packet, consisting from top to bottom in FIG. 2 of a woven gauze press mat 10, a first supporting screen 11 with a larger size of mesh than the press mat, e.g. about 0.75 mm, and a second supporting screen 12 with a still larger size of mesh, e.g. about 1 mm. As a matter of fact, within the spirit of the invention, one of the supporting screens (or both) may be a perforated plate screen.

The flange 9 protrudes from the ring 8 in an axial direction before the filter packet is received in the ring.

The special feature of flange 9 is that in the completed shape of the filter screen it has an inner diameter A which differs from the inner diameter B of the ring 8, and that A is preferably smaller than B. It is presumed that the longer useful life of the filter screen of the invention is among other things achieved by the favorable distribution and transmission of forces, as a result of the fact that the projection P of the inner diameter A of the flange 9 specifically does not coincide with the parallel tangents R between the curvatures of the ring 8 and the press platen 1.

Furthermore, for cocoa and similar presses, the locking of the ring 8 in the recess 3 is of importance. This can be achieved by means of a cord 13 made of Teflon or similar elastic material, or by other fastening means.

In an attempt to explain the considerably longer useful life which is provided by the invention one could suppose that the fastening means 13 exerts such a high strain in a radial inward direction on the ring 8 that the flange 9 tends to bend upward, or in any case offer increased resistance to the pressure in the press chamber of a high-pressure press. Generally speaking, that pressure becomes so extreme that only a few operations are sufficient for an originally almost-smooth press mat 10 to acquire a clear concentric pattern corresponding with the pattern of the grooves 5 in the press platen 1. One could also think of a lever effect which counteracts tilting in an inward direction, whereby the pressure of the inner edge of the flange on the press mat is reduced.

The preference given in the invention in the case of a cocoa or similar press for the embodiment wherein the inner diameter A of the flange 9 is smaller than the inner diameter B of the ring 8, results from the fact that in that embodiment little or no deformation of the press mat 10 occurs in the region of the projection of the parallel tangents R of the curvatures on the upper surface of the press mat 10. This prevails over the higher throughput of the embodiment in which the inner diameter A of the flange 9 is larger than the inner diameter B of the ring 8.

It is also possible to describe the invention by prescribing that the inner diameter A of flange 9 has to be outside the area of the angle $2\alpha$ defined by the fictitious connection lines V (see FIG. 2) between the touching point of the curvatures of the press platen 1 and the ring 8 on the one hand, and the inner diameter A of the flange 9 on the other, the angle $\alpha$ being at least 15°.

Figure 1:
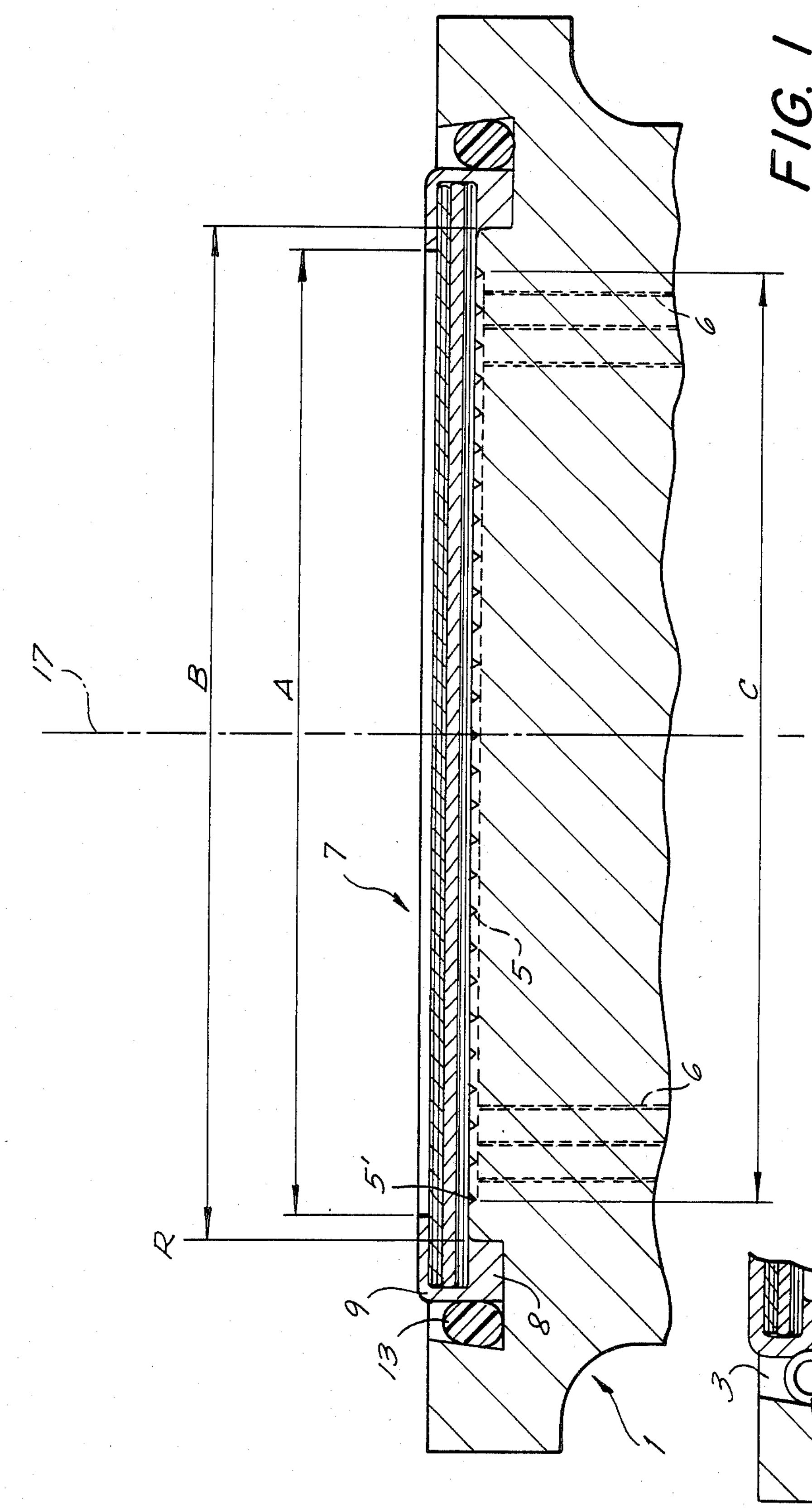
FIG. 1 shows a cross-section of a press platen with filter screens mounted in it.
Figure 4:
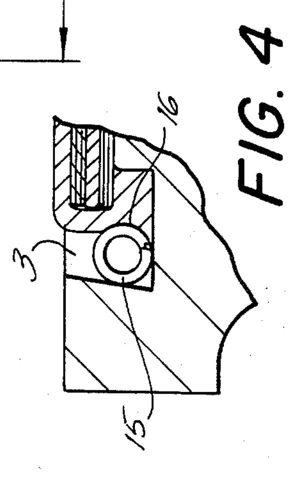
FIG. 4 is again a portion of the same view as FIG. 2, but showing a third embodiment wherein the fastening means is a helically wound metal spring.
Figure 3:
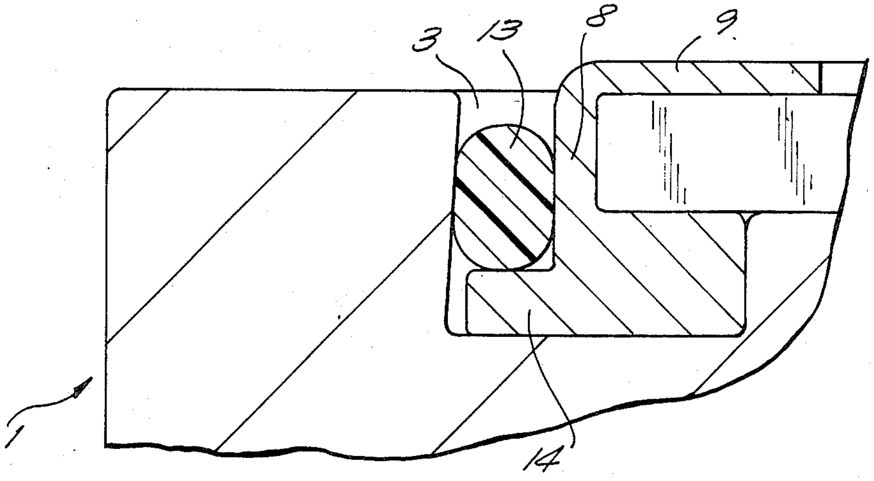
FIG. 3 is a portion of the same view as FIG. 2, but showing a second embodiment wherein a second peripheral flange extends outward below the fastening means.

Embodiments other than those shown in FIG. 2 are also within the scope of the invention. FIG. 3 shows a notable variant in which a second peripheral flange 14 extends outward below the fastening means 13. It is also possible for the fastening means 13 to be a helically wound metal spring 15 which can be snapped into the circular recess 3 (see FIG. 4). In the latter case, the circumferential surface of the ring 8 is preferably provided with a notch 16 to position the spring.

I claim:

1. In a filter for use in a high pressure separating press wherein said filter comprises: (i) a press platen having a front-face parallel to the material or object to be filtered, a circular recess in said front-face, and one or more circular grooves provided within said recess in said front-face, and (ii) a filter screen packet comprising one or more layers of flat filtering material positioned on said front-face and attached to said front-face by fastening means, the improvement comprising the positioning of said one or more layers of flat filtering material in a metal ring situated in the circular recess, said metal ring having a peripheral flange, such that a circumferential portion of said one or more layers of flat filtering material is encased between said flange and said metal ring, said flange extending from the ring in a radially inward direction towards the axis of the filter such that the inner diameter of said flange differs from the inner diameter of said ring by about half the difference between the diameter of the outermost circular groove provided in said front-face of said press platen and the inner diameter of said ring.

2. A filter as in claim 1 in which the inner diameter of the peripheral flange is smaller than the inner diameter of the ring.

3. A filter as in claim 2 in which the filter screen packet includes upper and lower supporting screens, each of said supporting screens having an upper and lower surface, with a woven gauze press mat on top of one of said supporting screens and the lower surface of the lower supporting screen being at about half the total height of the thickness of the ring plus the flange.

4. A filter as in claim 3 in which the ring is provided with a second peripheral flange which extends in an outward direction from the axis of the filter along the bottom of the circular recess in the press platen and which is situated below the fastening means.

5. A filter as in claim 2 in which the ring is provided with a second peripheral flange which extends in an outward direction from the axis of the filter along the bottom of the circular recess in the press platen and which is situated below the fastening means.

6. A filter as in claim 1 in which the filter screen packet includes upper and lower supporting screens, each of said supporting screens having an upper and lower surface, with a woven gauze press mat on top of one of said supporting screens and the lower surface of the lower supporting screen being at about half the total height of the thickness of the ring plus the flange.

7. A filter as in claim 6 in which the ring is provided with a second peripheral flange which extends in an outward direction from the axis of the filter along the bottom of the circular recess in the press platen and which is situated below the fastening means.

8. A filter as in claim 1 in which the ring is provided with a second peripheral flange which extends in an outward direction from the axis of the filter along the bottom of the circular recess in the press platen and which is situated below the fastening means.

9. A filter as in any one of claims 1–8 in which the fastening means is an elastic band or cord.

10. A filter as in any one of claims 1–8 in which the fastening means is a helically wound metal spring.

11. In a filter for use in a high pressure separating press wherein said filter comprises: (i) a press platen having a front-face parallel to the material or object to be filtered, a circular recess in said front-face, and one or more circular grooves provided within said recess in said front-face, and (ii) a filter screen packet comprising one or more layers of flat filtering material positioned on said front-face and attached to said front-face by fastening means, the improvement comprising the positioning of said one or more layers of flat filtering material in a metal ring situated in the circular recess, said metal ring having a peripheral flange such that a circumferential portion of said one or more layers of flat filtering material is encased between said flange and said metal ring, said flange having an upper and a lower surface the upper surface being further away from the material or object to be filtered and extending in a radially inward direction towards the axis of the filter such that an angle of at least 15° is formed between: (a) a first fictitious line drawn from a first point situated at the end of the upper surface of said peripheral flange closest to the axis of the filter to a second point which is the point closest to the object or material to be filtered where the ring and the press platen are in contact, and (b) a second ficitious line drawn perpendicular to the upper and lower surface of the peripheral flange.

12. A filter as in claim 11 in which the inner diameter of the peripheral flange is smaller than the inner diameter of the ring.

13. A filter as in claim 12 in which the filter screen packet includes upper and lower supporting screens, each of said supporting screens having an upper and lower surface, with a woven gauze press mat on top of one of said supporting screens and the lower surface of the lower supporting screen being at about half the total height of the thickness of the ring plus the flange.

14. A filter as in claim 13 in which the ring is provided with a second peripheral flange which extends in an outward direction from the axis of the filter along the bottom of the circular recess in the press platen and which is situated below the fastening means.

15. A filter as in claim 12 in which the ring is provided with a second peripheral flange which extends in an outward direction from the axis of the filter along the bottom of the circular recess in the press platen and which is situated below the fastening means.

16. A filter as in claim 11 in which the filter screen packet includes upper and lower supporting screens, each of said supporting screens having an upper and lower surface, with a woven gauze press mat on top of one of said supporting screens and the lower surface of the lower supporting screen being at about half the total height of the tickness of the ring plus the flange.

17. A filter as in claim 16 in which the ring is provided with a second peripheral flange which extends in an outward direction from the axis of the filter along the bottom of the circular recess in the press platen which is situated below the fastening means.

18. A filter as in claim 11 in which the ring is provided with a second peripheral flange which extends in an outward direction from the axis of the filter along the bottom of the circular recess in the press platen and which is situated below the fastening means.

19. A filter as in any one of claims 11–18 in which the fastening means is an elastic band or cord.

20. a filter as in any one of claims 11–18 in which the fastening means is a helically wound metal spring.

* * * * *